(12) United States Patent
Olstad et al.

(10) Patent No.: US 7,209,920 B2
(45) Date of Patent: Apr. 24, 2007

(54) LOW-OVERHEAD CONSISTENCY CHECK FOR SHARED RESOURCE USING FLUX INDICATOR

(75) Inventors: Chad Allen Olstad, Rochester, MN (US); David Finian Owen, Rochester, MN (US); Gary Ross Ricard, Chatfield, MN (US)

(73) Assignee: International Business Machines Corporation, Armonk, NY (US)

( * ) Notice: Subject to any disclaimer, the term of this patent is extended or adjusted under 35 U.S.C. 154(b) by 484 days.

(21) Appl. No.: 10/600,063

(22) Filed: Jun. 20, 2003

(65) Prior Publication Data

US 2004/0260852 A1    Dec. 23, 2004

(51) Int. Cl.
G06F 7/00 (2006.01)
G06F 17/30 (2006.01)

(52) U.S. Cl. .............................................. 707/9; 707/8

(58) Field of Classification Search ............. 707/1–10, 707/200–205; 395/200, 650
See application file for complete search history.

(56) References Cited

U.S. PATENT DOCUMENTS

| | | | | |
|---|---|---|---|---|
| 5,307,487 A | * | 4/1994 | Tavares et al. ................ | 707/8 |
| 5,692,178 A | * | 11/1997 | Shaughnessy .................. | 707/8 |
| 5,710,881 A | * | 1/1998 | Gupta et al. ................ | 709/200 |
| 5,873,116 A | * | 2/1999 | Van Fleet .................... | 711/147 |
| 6,393,419 B1 | * | 5/2002 | Novak et al. .................. | 707/8 |
| 6,654,908 B1 | * | 11/2003 | Lindsay et al. ............... | 714/20 |
| 6,718,349 B2 | * | 4/2004 | Weedon ...................... | 707/201 |
| 2003/0120669 A1 | * | 6/2003 | Han et al. ................... | 707/100 |
| 2004/0249812 A1 | * | 12/2004 | Scoredos ...................... | 707/9 |

* cited by examiner

*Primary Examiner*—Mohammad Ali
*Assistant Examiner*—Shew-Fen Lin
(74) *Attorney, Agent, or Firm*—Wood, Herron & Evans, LLP

(57) ABSTRACT

A flux indicator is utilized as a low-overhead consistency check for a shared resource such as a data structure, and provides a mechanism for determining both whether a data structure has or is currently in the process of being modified. In connection with attempts to modify the data structure, the flux indicator is updated from a first state to a second state prior to modifying the data structure, and thereafter updated to a third state after modifying the data structure, Copies of the flux indicator are then obtained both before and after attempting to obtain a copy of data from the data structure. The validity of the copy of the data is ensured when the first copy of the flux indicator does not indicate that the data structure is in the progress of being modified and the first and second copies of the flux indicator have the same state.

18 Claims, 2 Drawing Sheets

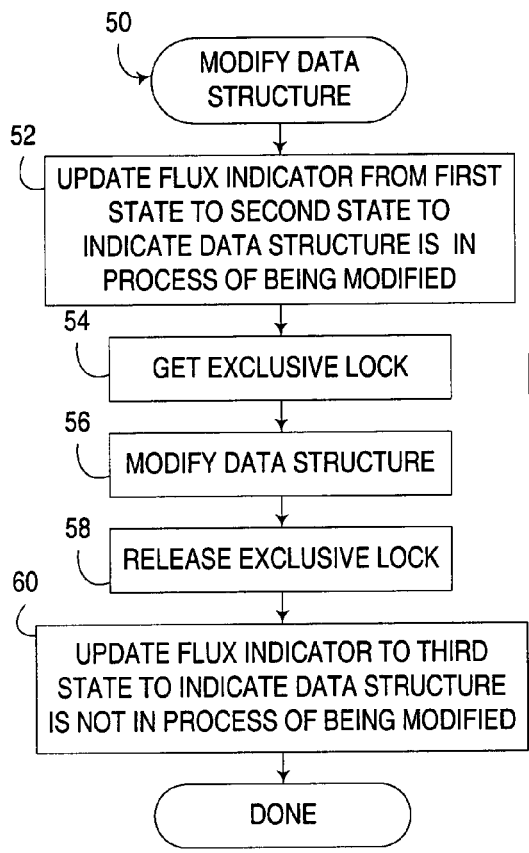
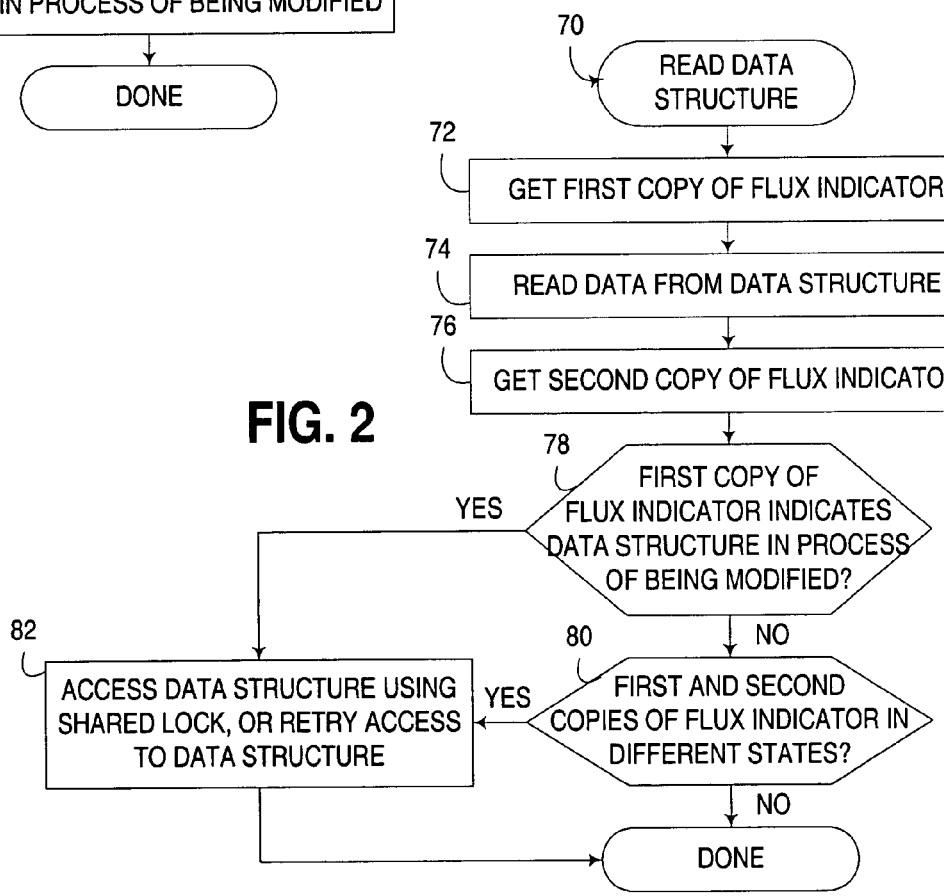

LOW-OVERHEAD CONSISTENCY CHECK FOR SHARED RESOURCE USING FLUX INDICATOR

FIELD OF THE INVENTION

The invention relates to computers and computer software, and in particular, to managing concurrent access to data structures and other shared resources in a computer.

BACKGROUND OF THE INVENTION

Given the continually increased reliance on computers in contemporary society, computer technology has had to advance on many fronts to keep up with increased demand. One particular subject of significant research and development efforts is parallelism, i.e., the performance of multiple tasks in parallel.

A number of computer software and hardware technologies have been developed to facilitate increased parallel processing. From a hardware standpoint, computers increasingly rely on multiple microprocessors to provide increased workload capacity. Furthermore, some microprocessors have been developed that support the ability to execute multiple threads in parallel, effectively providing many of the same performance gains attainable through the use of multiple microprocessors. From a software standpoint, multithreaded operating systems and kernels have been developed, which permit computer programs to concurrently execute in multiple threads so that multiple tasks can essentially be performed at the same time.

In addition, some computers implement the concept of logical partitioning, where a single physical computer is permitted to operate essentially like multiple and independent "virtual" computers (referred to as logical partitions), with the various resources in the physical computer (e.g., processors, memory, input/output devices) allocated among the various logical partitions. Each logical partition executes a separate operating system, and from the perspective of users and of the software applications executing on the logical partition, operates as a fully independent computer.

While parallelism effectively increases system performance by virtue of the ability to perform multiple tasks at once, one side effect of parallelism is increased system complexity due to the need to synchronize the operation of multiple concurrent processes or threads, particularly with regard to data structures and other system resources that are capable of being accessed by multiple processes or threads. Separate processes or threads that are capable of accessing specific shared data structures are typically not aware of the activities of other threads or processes. As such, a risk exists that one thread might access a specific data structure in an unexpected manner relative to another thread, creating indeterminate results and potential system errors.

As an example, the possibility exists that one thread may retrieve data from a data structure, while another thread may later change the data structure in some manner, resulting in each thread seeing a different state for the data structure. Efforts must be made, however, to ensure that the state of a data structure be consistent when viewed by different threads, otherwise indeterminate results can occur.

As but one of many examples, some computer systems concerned with resiliency and high availability rely on journaling systems to log changes to data structures such as objects and permit such objects to be recovered in the event of a failure in the computer system. As objects change, journal entries are typically created and written to a non-volatile memory such as a disk drive so that the objects can be recreated in the computer system's main (volatile) memory after a failure.

Some journaling systems are remote in nature, whereby activities that occur on one computer are duplicated on a second, redundant computer. In these remote journaling applications, the journaling systems on the redundant computers are often able to switch between live and standby modes. In a live mode, journal entries received from the primary computer are written directly to non-volatile storage on the redundant computer, along with maintaining current copies of the objects in the redundant computer's volatile memory by applying the journal entries to the copies of the objects in volatile memory. In a standby mode, the copies of the objects in the redundant computer are still kept current; however, the journal entries received from the primary computer are not written to non-volatile storage by the redundant computer.

It has been found that, when switching from standby mode to live mode, objects in volatile memory need to be forced or written to non-volatile storage so that later journal entries work off of the non-volatile copy of the objects for updates. However, for performance reasons, it is often desirable to allow a journal to switch modes prior to forcing all objects to non-volatile storage, and thereafter allow objects to be forced to non-volatile storage in connection with changes made to those objects. Consistency requires that an object be forced to non-volatile storage before a change is made to that object. As a result, any object that is being changed typically must be queried to determine whether the object needs to be forced to non-volatile storage prior to making the change.

Given, however, that objects may be concurrently accessed by different processes, a concern exists that a process attempting to query an object prior to modifying that object may do so at the same time the object is being modified by another process, which could potentially lead to indeterminate results, and potential system errors.

To address these concerns, a serialization mechanism such as a lock or semaphore may be used to limit the access to a shared data structure or other shared resource to one process at a time. A lock or semaphore is essentially a "token" that can be obtained exclusively by a process or thread in a multithreaded environment to access a particular shared resource. Before a process or thread can access a resource, it must first obtain the token from the system. If another process or thread currently possesses the token, the former process or thread is not permitted to access the resource until the token is released by the other process or thread. In this manner, the accesses to the resource are effectively "serialized" to prevent indeterminate operations from occurring.

In some environments, different types of locks or semaphores may be used. For example, "exclusive" locks or semaphores may be used to gate write access to a shared resource such as a data structure, so that only one thread is permitted to access a data structure when the state of the data structure is being modified. "Shared" locks or semaphores, however, may be used to gate read access to a data structure, to permit multiple threads that are not intending to modify the state of the data structure to concurrently access the data structure to obtain its current state.

While locks and semaphores enable a programmer to ensure complete serialization of a data structure or other shared resource, it has been found that the operations associated with obtaining such locks and semaphores can add significant overhead, and as a result, have an adverse impact on system performance, particularly in applications where data structures are frequently read but rarely modified.

For example, in the aforementioned journaling application, it may be desirable to use a semaphore in connection with querying journaled objects when transitioning from standby to live mode. Obtaining a semaphore, however, can add significant additional processing to the code path for querying journaled objects, and thus substantially increase the performance overhead of such an operation. Given the relative infrequency of updates to journaled objects as a whole, and the substantial overhead associated with querying large numbers of journaled objects, much of the effort associated with obtaining semaphores is effectively wasteful and burdensome on system performance.

A substantial need therefore exists in the art for a manner of maintaining consistency of a data structure or other shared resource among multiple threads in a multithreaded environment with lower overhead than typically provided by conventional serialization mechanisms.

SUMMARY OF THE INVENTION

The invention addresses these and other problems associated with the prior art in providing an apparatus, program product and method that utilize a flux indicator as a low-overhead consistency check for a shared resource such as a data structure.

A flux indicator consistent with the invention provides a mechanism for determining both whether the data structure has or is currently in the process of being modified. In connection with attempts to modify the data structure, the flux indicator is updated from a first state to a second state prior to modifying the data structure to indicate that the data structure is in the process of being modified, and updated to a third state after modifying the data structure to indicate that the data structure is no longer in the process of being modified.

The third state to which the flux indicator is set after modification of the data structure is different from each of the first and second states, which facilitates a determination of whether the data structure has been modified when an attempt is made to access data from the data structure. In particular, in connection with such an access to data from the data structure, a first copy of the flux indicator is obtained in connection with obtaining a copy of data from the data structure, and a second copy of the flux indicator is obtained after obtaining the copy of the data from the data structure. From the first and second copies of the flux indicator, the validity of the copy of the data obtained from the data structure can then be determined if the first copy of the flux indicator does not indicate that the data structure is in the progress of being modified and if the first and second copies of the flux indicator have the same state.

By utilizing a flux indicator in the manner described herein, often access to data from a shared data structure can be performed without the use of a serialization mechanism such as a lock or semaphore, thus avoiding the overhead associated with such mechanisms. Particularly when used in connection with frequently read, but rarely modified data structures, substantial performance increases can be obtained.

As will become more apparent below, a wide variety of different implementations of a flux indicator may be utilized consistent with the invention. One such implementation, for example, is to utilize a counter for the flux indicator. The counter may be initialized, for example, to zero or another even value, and incremented by one both prior to and after modifying an associated data structure. As a result, when data in the data structure is accessed, a copy of the counter may be obtained both prior to and after obtaining a copy of the desired data. An odd value for a copy of the counter would indicate that the data structure is currently "in flux" or being modified, while different values for the two copies of the counter obtained in connection with obtaining the desired data would indicate that the data structure was modified in the time period between obtaining the two copies of the counter. In either event, it would be determinable that the obtained copy of the desired data was not trusted to be valid, whereby remedial actions, such as obtaining a semaphore, or retrying the access, could be performed to ensure that a valid copy of the desired data was obtained.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 1 is a flowchart illustrating a modify data structure routine utilizing a flux indicator consistent with the invention.

FIG. 2 is a flowchart illustrating a read data structure routine utilizing a low-overhead consistency check in connection with the flux indicator utilized in the modify data structure routine of FIG. 1.

DETAILED DESCRIPTION

Figure 3:
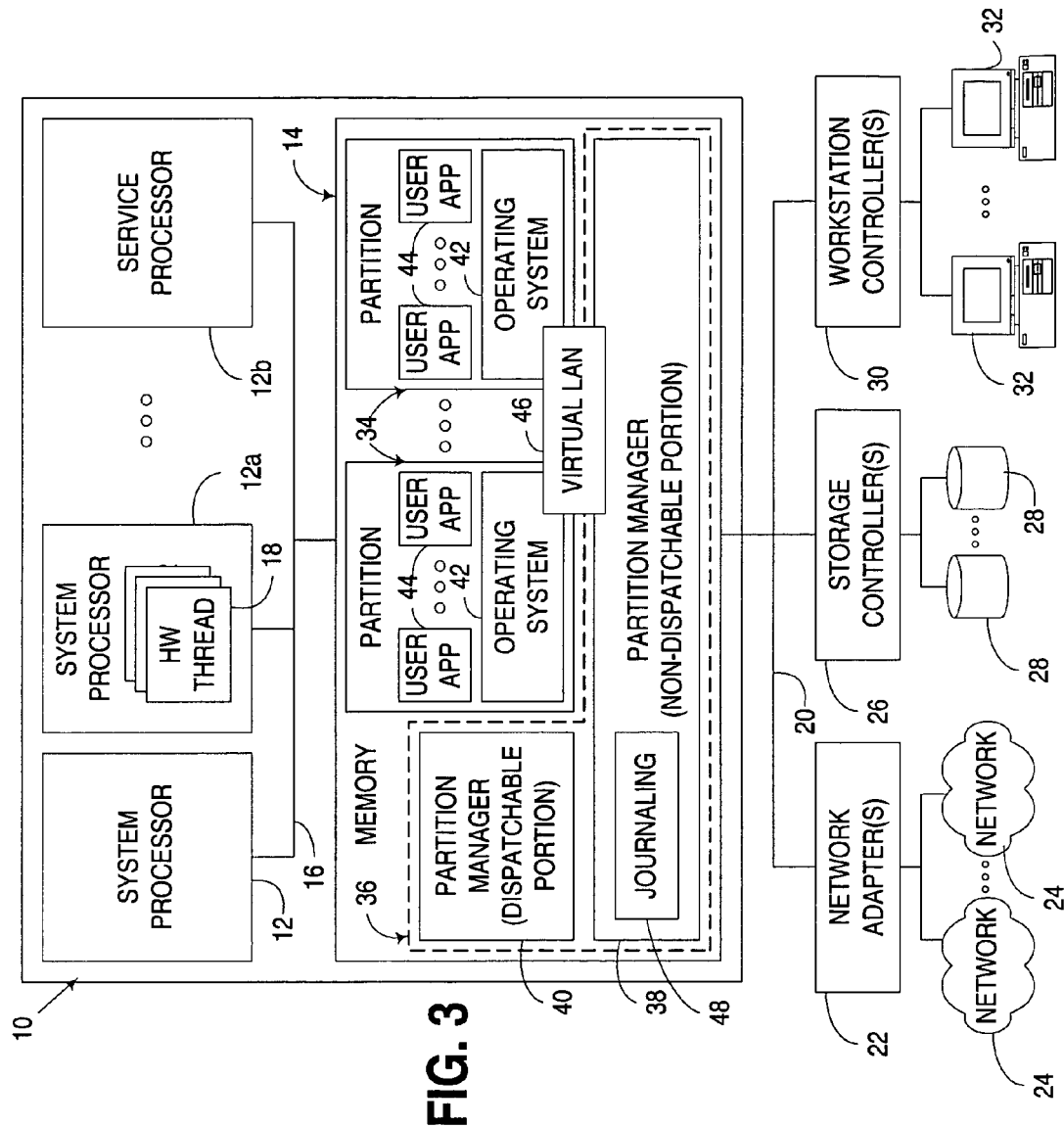
FIG. 3 is a block diagram of the principal hardware components in a logically-partitioned computer utilizing a journaling system incorporating low-overhead consistency checks consistent with the invention.

The embodiments discussed hereinafter utilize a flux indicator to facilitate the performance of low-overhead consistency checks for a data structure being gated by the flux indicator. Of note, the data structure being gated by the flux indicator may include practically any type of data structure, e.g., an object, a database record, or any collection of same. Moreover, multiple fields or elements of data may be incorporated within a data structure and gated by the same flux indicator. As such, one advantage of the herein-described flux indicator is that multiple data elements resident in the same data structure may be accessed with only one low-overhead consistency check utilized to determine the validity of such data elements.

Turning to the Drawings, wherein like numbers denote like parts throughout the several views, FIG. 1 illustrates a modify data structure routine 50 that may be performed to update a data structure gated by a flux indicator in a manner consistent with the invention. As will become more apparent below, a flux indicator consistent with the invention provides a mechanism for determining both whether a data structure has been modified, or is still in the process of being modified, in connection with an access to the data structure. In this regard, a flux indicator consistent with the invention may be set to at least one of three different states in connection with modifying the data structure.

In particular, as shown in block 52, the flux indicator is typically updated from a first state to a second state prior to modifying the data structure. Thereafter, an exclusive lock is typically obtained for the data structure in block 54, thereby inhibiting other threads from attempting to read or write to the data structure during modification by the thread executing routine 50. Modification of the data structure then occurs in block 56, followed by a release of the exclusive lock in block 58. After release of the exclusive lock, block 60 then updates the flex indicator to a third state, and routine 50 is then complete. As such, the flux indicator is set to a different state both before and after modifying the data structure.

When the data structure is accessed to retrieve data therefrom, a first copy of the flux indicator is retrieved in connection with reading the data, e.g., immediately prior thereto, and a second copy of the flux indicator is retrieved after reading the data. For example, as shown in FIG. 2, a read data structure routine 70, which may be executed when it is desirable to retrieve data from a data structure, may retrieve a first copy of a flux indicator in block 72, read data from the data structure in block 74, and retrieve a second copy of the flux indicator in block 76.

To determine the validity of the data retrieved in block 74, a low-overhead consistency check, performed in blocks 78 and 80, may be performed. In particular, block 78 determines whether the first copy of the flux indicator indicates that the data structure is currently in the process of being modified by another thread, e.g., if the flux indicator is set to the second state described above in connection with routine 50.

Block 80 determines whether the first and second copies of the flux indicator are in different states, e.g., to determine whether the flux indicator transitioned from the first state, to the second state, and finally to the third state, indicating that the data structure was modified by another thread between retrieval of the two copies of the flux indicator.

If neither test is met, the data is valid, and the data may then be used as appropriate, whereby routine 70 is complete. Otherwise, if either test is met, control passes to block 82 to attempt to retrieve the data by other means. For example, one manner of retrieving the data is to obtain a conventional serialization mechanism, such as a shared lock, on the data structure, prior to retrieving the data. Another variation is to retry the sequence of steps 72–80 again, either a predetermined number of times, or until valid data is eventually obtained. In the alternative, an attempt to retrieve data that results in the data being determined to be invalid may result in an error or exception, requiring a calling routine to perform other actions to request the data.

It should be noted that, even though a serialization mechanism may be used in block 82, the sequence of blocks 72–80 does not rely on any serialization mechanism, and thus the overhead associated with obtaining a serialization mechanism is avoided so long as the data is determined to be valid. Particularly in scenarios where a data structure is updated only rarely, it will be appreciated that the majority of read accesses to the data structure will not require a serialization mechanism to be obtained, thus reducing the overhead associated with retrieving the data.

A wide variety of different variations may be utilized for a flux indicator having the characteristics described above.

For example, one implementation of a flux indicator is as a counter, wherein the flux indicator includes a count value that is capable of being set to one of first and second sets of values. The first set of values may be used to indicate that the data structure is not currently in the progress of being modified, while the second set of values may be used to indicate that the data structure is currently in the progress of being modified. As such, whenever a thread attempts to access the data structure to modify any of the data any such data structure, the thread typically will update the count value to a value from the second set of values. Likewise, once the modification of the data structure is complete, the thread may then select a value from the first set of values. Thus, by determining whether the count value is in the first or second set of values, a determination may therefore be made as to whether the data structure is currently in the process of being modified.

In addition, when the count value is updated after modification of a data structure, the value selected is typically a value from the first set of values that is at least different from the count value that was in use immediately prior to selecting a count value from the second set of values in connection with attempting to modify the data structure. By doing so, another thread attempting to access the data structure to retrieve data therefrom (i.e., a read-type access) can determine that the data has not been modified by determining whether the two copies of the flux indicator are the same count value.

The first and second sets of values may take a number of different forms. For example, the first set of values may comprise even numbers, with the second set of values comprising odd numbers, or vice versa. In this scenario, each update of the flux indicator during modification of the data structure may be implemented simply as an increment or decrement operation on the count value.

Other values may also be used for the first and second sets of values, e.g., monotonic sequences, prime number sequences, Fibonacci sequences, or practically any other algorithmic sequence not having a high likelihood of repeating. Moreover, the sequences may be finite or infinite. As an example, a count value may be represented by an integer that never rolls over within the reasonable lifetime of the flux indicator (e.g., prior to being reset as a result of a restart of the computer), or in the alternative, the integer could roll over after a predetermined value (e.g., if the count value was represented by a 16-bit integer, the count value would roll over at a value of 65536), so long as little risk exists that the value of the flux indicator when captured prior to and after reading a data structure could not be the same if one or more modifications to the data structure occurred between the two captures of the data structure.

A flux indicator may also be represented by a clock or a random number generator in some implementations. For example, a flux indicator may be implemented using a time stamp, e.g., which is updated after a data structure is modified. Changes in the time stamp in copies of the flux indicator retrieved before and after data is retrieved would then indicate that the data structure was modified.

A flux indicator may also include an in flux flag, which may be set prior to updating a data structure and reset after the update is complete. In this regard, an in flux flag could be implemented by utilizing a single number for the second set of values. Furthermore, in implementations where a count value that is updated between odd and even numbers is used as a flux indicator, the in flux flag may be considered to be the lease significant bit of the flux indicator. An in flux flag may also be separate from any counter or set of values in some implementations.

In addition, when an in flux indicator is combined with a counter or a time stamp, as described above, the tests described above in connection with blocks 78 and 80 of FIG. 2 could be implemented by accessing the in flux flag in block 78, and accessing a counter, time stamp, or other mechanism that identifies when a data structure has been modified between retrieval of the two copies of the flux indicator, but is no longer in the process of being modified.

A wide variety of other implementations of a flux indicator, which will be apparent to one of ordinary skill in the art having the benefit of the instant disclosure, may be used in the alternative. Therefore, the invention is not limited to the particular implementations discussed herein.

Now turning to FIG. 3, an exemplary implementation of the invention in connection with a journaling system is implemented in a computer 10. Computer 10 generically represents, for example, any of a number of multi-user computers such as a network server, a midrange computer, a mainframe computer, etc., e.g., an IBM eServer computer. However, it should be appreciated that the invention may be implemented in other computers and data processing systems, e.g., in single-user computers such as workstations, desktop computers, portable computers, and the like, or in other programmable electronic devices (e.g., incorporating embedded controllers and the like). In addition, the invention may also be utilized in connection with non-logically partitioned multithreaded computers.

As best shown in FIG. 3, computer 10 generally includes one or more processors 12 coupled to a memory 14 via a bus 16. Each processor 12 may be implemented as a single threaded processor, or as a multithreaded processor, such as with processor 12a, which is shown incorporating a plurality of hardware threads 18. For the most part, each hardware thread 18 in a multithreaded processor 12a is treated like an independent processor by the software resident in the computer. In this regard, for the purposes of this disclosure, a single threaded processor will be considered to incorporate a single hardware thread, i.e., a single independent unit of execution. It will be appreciated, however, that software-based multithreading or multitasking may be used in connection with both single threaded and multithreaded processors to further support the parallel performance of multiple tasks in the computer.

In addition, as is also illustrated in FIG. 3, one or more of processors 12 (e.g., processor 12b) may be implemented as a service processor, which is used to run specialized firmware code to manage system initial program loads (IPL's), and to monitor, diagnose and configure system hardware. Generally, computer 10 will include one service processor and multiple system processors, which are used to execute the operating systems and applications resident in the computer, although the invention is not limited to this particular implementation. In some implementations, a service processor may be coupled to the various other hardware components in the computer in manner other than through bus 16.

Memory 14 may include one or more levels of memory devices, e.g., a DRAM-based main storage, as well as one or more levels of data, instruction and/or combination caches, with certain caches either serving individual processors or multiple processors as is well known in the art. Furthermore, memory 14 is coupled to a number of types of external devices via a bus 20, e.g., one or more network adapters 22 (for interfacing the computer with network(s) 24), one or more storage controllers 26 (for interfacing the computer with one or more storage devices 28) and one or more workstation controllers 30 (for interfacing with one or more terminals or workstations 32 via a plurality of workstation adapters).

FIG. 3 also illustrates in greater detail the primary software components and resources utilized in implementing a logically partitioned computing environment on computer 10, including a plurality of logical partitions 34 managed by a partition manager or hypervisor 36. Any number of logical partitions may be supported as is well known in the art, and the number of logical partitions resident at any time in a computer may change dynamically as partitions are added or removed from the computer.

In the illustrated IBM eServer-based implementation, partition manager 36 is comprised of two layers of program code. The first, referred to herein as a non-dispatchable portion 38, is implemented within the firmware, or licensed internal code (LIC), of computer 10, which is utilized to provide a low level interface to various hardware components while isolating higher layers, e.g., the operating systems, from the details of the hardware access. The second layer of program code in partition manager 36 is referred to herein as a dispatchable portion 40. In contrast to non-dispatchable portion 38, which has no concept of tasks, is run with relocation off, and is accessible via function calls from higher layers of software, the dispatchable portion 40 has the concept of tasks (like any operating system), and is run with relocation on.

Each logical partition 34 is typically statically and/or dynamically allocated a portion of the available resources in computer 10. For example, each logical partition may be allocated one or more processors 12 and/or one or more hardware threads 18, as well as a portion of the available memory space. Logical partitions can share specific hardware resources such as processors, such that a given processor is utilized by more than one logical partition. In the alternative hardware resources can be allocated to only one logical partition at a time.

Additional resources, e.g., mass storage, backup storage, user input, network connections, and the I/O adapters therefor, are typically allocated to one or more logical partitions in a manner well known in the art. Resources may be allocated in a number of manners, e.g., on a bus-by-bus basis, or on a resource-by-resource basis, with multiple logical partitions sharing resources on the same bus. Some resources may even be allocated to multiple logical partitions at a time.

Each logical partition 34 utilizes an operating system 42 that controls the primary operations of the logical partition in the same manner as the operating system of a non-partitioned computer. For example, each operating system 42 may be implemented using the OS/400 operating system available from International Business Machines Corporation.

Each logical partition 34 executes in a separate, or independent, memory space, and thus each logical partition acts much the same as an independent, non-partitioned computer from the perspective of each user application (user app) 44 that executes in each such logical partition. As such, user applications typically do not require any special configuration for use in a partitioned environment.

Given the nature of logical partitions 34 as separate virtual computers, it may be desirable to support inter-partition communication to permit the logical partitions to communicate with one another as if the logical partitions were on separate physical machines. As such, in some implementations it may be desirable to support a virtual local area network (LAN) 46 in non-dispatchable portion 38 to permit logical partitions 34 to communicate with one another via a networking protocol such as the Ethernet protocol. Other manners of supporting communication between partitions may also be supported consistent with the invention.

Also provided within computer 10, typically in the licensed internal code (either within or outside of partition manager 36, is a journaling system 48, which is used to journal changes to objects so that the objects can be re-created after a system failure. The journaling system may journal objects in different partitions, as well as objects resident on other computers, e.g., other computers in the same cluster. It will also be appreciated that a journaling system need not be implemented in a logically-partitioned computer, as a wide variety of other computers have traditionally relied on journaling as a mechanism for improving fault tolerance and ensuring high availability.

It the illustrated embodiment of FIG. 3, remote journaling is implemented in computer 10, whereby the journaling system is used to journal objects on different computers, or in different logical partitions. The journaling system incorporates live and standby modes, whereby in live mode, journal entries received from a primary computer/partition are written directly to non-volatile storage on a redundant computer/partition, along with maintaining current copies of the objects in the redundant computer/partition's volatile memory by applying the journal entries to the copies of the objects in volatile memory. In standby mode, the copies of the objects in the redundant computer/partition are still kept current; however, the journal entries received from the primary computer/partition are not written to non-volatile storage by the redundant computer/partition.

To switch from standby mode to live mode, objects managed by the journaling system that are modified in volatile memory must be forced to non-volatile storage so that later journal entries work off of the non-volatile copy of the objects for updates. In connection with such a switch, each journaled object is typically queried to determine whether the object needs to be forced to non-volatile storage.

To facilitate the switching of a journaled object between standby and live modes, each journaled object in the illustrated implementation includes an object state (objState) that indicates whether the object is in standby or live mode, and a "needs processing" flag (objNeedsProc) that indicates whether certain operations, e.g., forcing the object to non-volatile storage, need to be performed on the object. In addition, the journaled object includes a lock or gate (obj-Gate) that represents a serialization mechanism for the object, and a flux indicator (objFluxCount) that is implemented in this implementation as a count value that alternates between even and odd values, with even values indicating that the object is not in the process of being modified.

Table I below illustrates pseudocode for an exemplary state change procedure (StateChange) that may be used to update or modify a journaled object in a manner consistent with the invention:

TABLE I

STATE CHANGE PROCEDURE

```
StateChange Proc;
    objFluxCount = objFluxCount + 1;
    Gate(objGate) LockExclusive;
    ...
    /* do some stuff */
    ...
    objNeedsProc = On;
    ...
    if requestedState = On then
        objState = On;
    else
        objState = Off;
    ...
    Gate(objGate) UnlockExclusive;
```

TABLE I-continued

STATE CHANGE PROCEDURE

```
    objFluxCount = objFluxCount + 1;
    ...
End StateChange;
```

Table II below illustrates pseudocode for an exemplary procedure (CheckState) for checking the state of the object and its related fields:

TABLE II

CHECK STATE PROCEDURE

```
CheckState Proc;
    Dcl localObjState;
    Dcl localObjFluxCount;
    Dcl localObjNeedsProc;
    localObjFluxCount = objFluxCount
    localObjState = objState;
    localObjNeedsProc = objNeedsProc;
    If ((localObjFluxCount & 0x0001) = 0)
        & (localObjNeedsProc = Off)
        & (objFluxCount = localObjFluxCount)
    Then
        return localObjState;
    Else
        Do;
            Gate(objGate) LockShared;
            If objNeedsProc = On Then
                Do;
                    /* object specific processing */
                    objNeedsProc = Off;
                End;
            Else
                ;
            localObjState = objState;
            Gate(objGate) UnlockShared;
            return localObjState;
    End
```

It should be noted that the pseudocode in Table II implements a shared serialization mechanism in the event that invalid data is detected. As an alternative, no shared serialization mechanism may be obtained in the event of invalid data. Instead, the attempt to check the object state may simply be repeated until valid data is obtained, as illustrated by the pseudocode in Table III below:

TABLE III

ALTERNATE CHECK STATE PROCEDURE

```
CheckState Proc:
    Dcl localObjState;
    Dcl localObjFluxCount;
    Dcl localObjNeedsProc;
    Do Until (((localObjFluxCount & 0x0001) = 0)
        & (objFluxCount = localObjFluxCount));
        localObjFluxCount = objFluxCount
        localObjState = objState;
        localObjNeedsProc = objNeedsProc;
    End;
    If localObjNeedsProc = Off
    Then
        return localObjState;
    Else
        Do;
            Gate(objGate) LockShared;
            If objNeedsProc = On Then
                Do;
                    /* object specific processing */
                    ObjNeedsProc = Off;
                End;
```

TABLE III-continued

ALTERNATE CHECK STATE PROCEDURE

```
Else
   ;
   localObjState = objState;
   Gate(objGate) UnlockShared;
   return localObjState;
End;
```

In other embodiments, the example pseudocode of Table III may omit the use of a shared lock. Furthermore, in some embodiments, a timer may be used to prevent the pseudocode from spinning infinitely waiting for the request is satisfied.

It will be appreciated that journaled objects are updated relatively infrequently. Moreover, it will also be appreciated that checking the state of an object can be performed frequently, and may have to be performed for a large number of objects, thus placing significant processing requirements on a journaling system. Given the relatively infrequent updates to objects, therefore, in the vast majority of object checks, valid data will be obtained, and as such, a relatively short execution path, avoiding the need for obtaining a serialization mechanism, will be encountered the majority of the state checks using the routines described above.

It will be appreciated that the journaling implementation discussed herein is not the exclusive implementation of the invention. Moreover, various additional modifications to the herein-described embodiments will be apparent to one of ordinary skill in the art having the benefit of the instant disclosure. Therefore, the invention lies in the claims hereinafter appended.

What is claimed is:

1. A computer-implemented method of accessing a data structure, the method comprising:
   initializing a flux count associated with a data structure to an even value; in response to a request to modify the data structure, sequentially and in order:
   incrementing the flux count to an odd value;
   acquiring an exclusive serialization mechanism for the data structure;
   modifying the data structure;
   releasing the exclusive serialization mechanism; and
   incrementing the flux count to an even value; and in response to a request to access data from the data structure, sequentially and in order:
   copying the flux count to obtain a first copy of the flux count;
   copying the requested data from the data structure to obtain a copy of the requested data;
   copying the flux count to obtain a second copy of the flux count; and
   determining that the copy of the requested data is valid if the first copy of the flux count is an even value and the first and second copies of the flux count are equal.

2. The method of claim 1, further comprising, in response to the request to access data from the data structure determining that the copy of the requested data is not valid if either the copy of the flux count is an odd value or the first and second copies of the flux count are not equal.

3. The method of claim 2, further comprising, in response to determining that the copy of the requested data is not valid, acquiring a shared serialization mechanism for the data structure and obtaining a copy of the requested data while the shared serialization mechanism is acquired.

4. The method of claim 2, further comprising, in response to determining that the copy of the requested data is not valid, repeating the copying of the flux count and the copying of the requested data from the data structure until the copy of the flux count is an even value and the copy of the flux count is still equal to the flux count.

5. A computer-implemented method of accessing a data structure, the method comprising:
   in connection with modifying the data structure:
      prior to modifying the data structure, updating a flux indicator associated with the data structure from a first state to a second state to indicate that the data structure is in the process of being modified; and
      after modifying the data structure, updating the flux indicator to a third state to indicate that the data structure is no longer in the process of being modified, wherein the third state is different from each of the first and second states; and
   in connection with accessing data from the data structure:
      obtaining a first copy of the flux indicator in connection with obtaining a copy of data from the data structure;
      obtaining a second copy of the flux indicator after obtaining the copy of the data from the data structure; and
      determining that the copy of the data from the data structure is valid if the first copy of the flux indicator does not indicate that the data structure is in the process of being modified and if the first and second copies of the flux indicator have the same state;
   wherein the flux indicator includes a count value, wherein the first state of the flux indicator includes an even count value, wherein updating the flux indicator from the first state to the second state includes incrementing the flux indicator to an odd count value, wherein updating the flux indicator to the third state includes incrementing the flux indicator to an even count value, wherein determining that the copy of the data from the data structure is valid includes determining if the count values for the first and second copies of the flux indicator are equal and determining if the first copy of the flux indicator is set to an even count value, and wherein modifying the data structure further includes, after updating the flux indicator from the first state to the second state and before updating the flux indicator to the third state, acquiring an exclusive serialization mechanism for the data structure, thereafter modifying the data structure, and thereafter releasing the exclusive serialization mechanism.

6. The method of claim 5, wherein accessing the data from the data structure is performed without acquiring a serialization mechanism.

7. The method of claim 5, wherein accessing the data from the data structure further comprises accessing the data from the data structure after acquiring a shared serialization mechanism in response to determining that the copy of the data from the data structure is not valid.

8. The method of claim 5, wherein accessing the data from the data structure further comprises determining that the copy of the data from the data structure is not valid, and in response thereto, repeatedly obtaining of the first copy of the flux indicator, obtaining the copy of data from the data structure, and obtaining the second copy of the flux indicator until the first copy of the flux indicator does not indicate that the data structure is in the process s of being modified and the first and second copies of the flux indicator have the same state.

9. The method of claim 5, wherein the data from the data structure includes a plurality of fields, wherein obtaining the first copy of the flux indicator in connection with obtaining the copy of the data from the data structure includes obtaining the first copy of the flux indicator in connection with obtaining copies of the plurality of fields, and wherein determining that the copy of the data from the data structure is valid includes determining that the copies of the plurality of fields are valid based upon the flux indicator.

10. The method of claim 5, wherein the data structure comprises a journaled object, and wherein the data in the data structure includes an indication of whether the journaled object is in a standby mode.

11. An apparatus, comprising:
a memory and at least one processor;
a data structure resident in the memory;
a flux indicator associated with the data structure;
first program code configured to execute on the at least one processor to modify the data structure, the first program code configured to, prior to modifying the data structure, update the flux indicator from a first state to a second state to indicate that the data structure is in the process of being modified, and, after modifying the data structure, update the flux indicator to a third state to indicate that the data structure is no longer in the process of being modified, wherein the third state is different from each of the first and second states; and
second program code configured to execute on the at least one processor to access data from the data structure, the second program code configured to obtain a first copy of the flux indicator in connection with obtaining a copy of data from the data structure, obtain a second copy of the flux indicator after obtaining the copy of the data from the data structure, and determine that the copy of the data from the data structure is valid if the first copy of the flux indicator does not indicate that the data structure is in the process of being modified and if the first and second copies of the flux indicator have the same state;
wherein the flux indicator includes a count value, wherein the first state of the flux indicator includes one of an even and an odd count value, wherein the first program code is configured to, if the first state of the flux indicator is an even count value, update the flux indicator from the first state to the second state by incrementing the flux indicator to an odd count value, and if the first state of the flux indicator is an odd count value, update the flux indicator from the first state to the second state by incrementing the flux indicator to an even count value, wherein the first program code is configured to, if the first state of the flux indicator is an even count value, update the flux indicator to the third state by incrementing the flux indicator to an even count value, and if the first state of the flux indicator is an odd count value, update the flux indicator to the third state by incrementing the flux indicator to an odd count value, wherein the second program code is configured to, if the first state of the flux indicator is an even count value, determine that the copy of the data from the data structure is valid by determining if the count values for the first and second copies of the flux indicator are equal and determining if the first copy of the flux indicator is set to an even count value, and if the first state of the flux indicator is an odd count value, determine that the copy of the data from the data structure is valid by determining if the count values for the first and second copies of the flux indicator are equal and determining if the first copy of the flux indicator is set to an odd count value, and wherein the first program code is configured to modify the data structure by, after updating the flux indicator from the first state to the second state and before updating the flux indicator to the third state, acquiring an exclusive serialization mechanism for the data structure, thereafter modifying the data structure, and thereafter releasing the exclusive serialization mechanism.

12. The apparatus of claim 11, wherein the second program code is configured to access the data from the data structure without acquiring a serialization mechanism.

13. The apparatus of claim 11, wherein the second program code is configured to access the data from the data structure by accessing the data from the data structure after acquiring a shared serialization mechanism in response to determining that the copy of the data from the data structure is not valid.

14. The apparatus of claim 11, wherein the second program code is configured to access the data from the data structure by determining that the copy of the data from the data structure is not valid, and in response thereto, repeatedly obtaining of the first copy of the flux indicator, obtaining the copy of data from the data structure, and obtaining the second copy of the flux indicator until the first copy of the flux indicator does not indicate that the data structure is in the process of being modified and the first and second copies of the flux indicator have the same state.

15. The apparatus of claim 11, wherein the data from the data structure includes a plurality of fields, wherein the second program code is configured to obtain the first copy of the flux indicator in connection with obtaining the copy of the data from the data structure by obtaining the first copy of the flux indicator in connection with obtaining copies of the plurality of fields, and wherein the second program code is configured to determine that the copy of the data from the data structure is valid by determining that the copies of the plurality of fields are valid based upon the flux indicator.

16. The apparatus of claim 11, wherein the data structure comprises a journaled object, and wherein the data in the data structure includes an indication of whether the journaled object is in a standby mode.

17. A program product, comprising:
first program code configured to modify a data structure, the first program code configured to, prior to modifying the data structure, update a flux indicator associated with the data structure from a first state to a second state to indicate that the data structure is in the process of being modified, and, after modifying the data structure, update the flux indicator to a third state to indicate that the data structure is no longer in the process of being modified, wherein the third state is different from each of the first and second states;
second program code configured to access data from the data structure, the second program code configured to obtain a first copy of the flux indicator in connection with obtaining a copy of data from the data structure, obtain a second copy of the flux indicator after obtaining the copy of the data from the data structure, and determine that the copy of the data from the data structure is valid if the first copy of the flux indicator does not indicate that the data structure is in the process of being modified and if the first and second copies of the flux indicator have the same state; and
a tangible computer readable storage medium bearing the first and second program code;
wherein the flux indicator includes a count value, wherein the first state of the flux indicator includes one of an even and an odd count value, wherein the first program code is configured to, if the first state of the flux indicator is an even count value, update the flux indicator from the first state to the second state by incrementing the flux indicator to an odd count value, and if the first state of the flux indicator is an odd count value, update the flux indicator from the first state to the second state by incrementing the flux indicator to an even count value, wherein the first program code is configured to, if the first state of the flux indicator is an even count value, update the flux indicator to the third state by incrementing the flux indicator to an even count value, and if the first state of the flux indicator is an odd count value, update the flux indicator to the third state by incrementing the flux indicator to an odd count value, wherein the second program code is configured to, if the first state of the flux indicator is an even count value, determine that the copy of the data from the data structure is valid by determining if the count values for the first and second copies of the flux indicator are equal and determining if the first copy of the flux indicator is set to an even count value, and if the first state of the flux indicator is an odd count value, determine that the copy of the data from the data structure is valid by determining if the count values for the first and second copies of the flux indicator are equal and determining if the first copy of the flux indicator is set to an odd count value, and wherein the first program code is configured to modify the data structure by, after updating the flux indicator from the first state to the second state and before updating the flux indicator to the third state, acquiring an exclusive serialization mechanism for the data structure, thereafter modifying the data structure, and thereafter releasing the exclusive serialization mechanism.

18. A computer-implemented method of accessing a data structure, the method comprising:
  in connection with modifying the data structure:
    prior to modifying the data structure, updating a flux indicator associated with the data structure from a first state to a second state to indicate that the data structure is in the process of being modified; and
    after modifying the data structure, updating the flux indicator to a third state to indicate that the data structure is no longer in the process of being modified, wherein the third state is different from each of the first and second states; and
  in connection with accessing data from the data structure:
    obtaining a first copy of the flux indicator in connection with obtaining a copy of data from the data structure;
    obtaining a second copy of the flux indicator after obtaining the copy of the data from the data structure; and
    determining that the copy of the data from the data structure is valid if the first copy of the flux indicator does not indicate that the data structure is in the process of being modified and if the first and second copies of the flux indicator have the same state;
wherein the flux indicator includes a count value, wherein the first state of the flux indicator includes an odd count value, wherein updating the flux indicator from the first state to the second state includes incrementing the flux indicator to an even count value, wherein updating the flux indicator to the third state includes incrementing the flux indicator to an odd count value, wherein determining that the copy of the data from the data structure is valid includes determining if the count values for the first and second copies of the flux indicator are equal and determining if the first copy of the flux indicator is set to an odd count value, and wherein modifying the data structure further includes, after updating the flux indicator from the first state to the second state and before updating the flux indicator to the third state, acquiring an exclusive serialization mechanism for the data structure, thereafter modifying the data structure, and thereafter releasing the exclusive serialization mechanism.

* * * * *